UNITED STATES PATENT OFFICE 2,649,196

PACKAGED FERTILIZER ELEMENTS

Louis Wayne Arny, Wayne, and Henry W. Stevens, Phoenixville, Pa.

No Drawing. Application July 18, 1949, Serial No. 105,450

1 Claim. (Cl. 206—46)

It is an object of this invention to provide a method by which soil replenishing elements can be distributed equally over a given area and absorbed and diffused slowly through the soil at any desired sub-soil level.

It is a further object of this invention to provide certain packaging units which are useful in carrying out the method aforesaid.

The method and apparatus of this invention are particularly useful in replenishing the so-called minor elements, e. g., copper, boron, zinc, manganese and iron. Its particular utility with respect to the minor elements lies in the fact that the quantities per acre are relatively quite small, e. g., from 40 to 70 lbs. per acre, and the problem of equal distribution in that case is correspondingly severe.

Qualitative soil analysis can be extremely misleading as to the actual deficiencies. An analysis, for example, may reveal what are apparently entirely adequate quantities of all of the minor elements and yet a deficiency may exist because the chemical form in which such elements are combined is such that those elements are unavailable to growing crops. It is further a fact that when a soluble compound is supplied to the soil, a rapid wetting and absorption action may convert the compound from one in which the desirable element is available to one in which it is not.

In the case of the minor elements, it is particularly desirable to have these absorbed below the surface and at a slow rate, since any excess localized concentration can produce a toxicity of the soil with great crop damage and even injury to live stock.

Briefly, the method of this invention contemplates providing a number of small unit packages each containing a mixture of minor elements. As a concrete example, and assuming that 40 lbs. are to be distributed per acre, the basic mix would run as follows:

|  | Pounds |
| --- | --- |
| Copper sulphate | 5 |
| Borax | 5 |
| Zinc sulphate | 5 |
| Manganese oxide or sulphide | 20 |
| Ferric sulphate | 5 |

This would be divided between 4900 individual packages which would thus contain approximately .130 ounce of the minor element mix and one ounce of inert material, such as sand, used as a filler. These would be distributed at the bottom of the furrows in the course of plowing, at depths running from 6 to 12 inches, depending on the contemplated root depth of the crop. Horizontally the bags would be dropped at approximately 3' x 3' spacing and, of course, would be covered in the course of the plowing.

Except in very unusual soil conditions, minor elements need be supplied only every three or four years. In normal, soil applications oftener than every three years might yield cumulative results which would produce toxicity. It will be understood that on the average crop the root system is not harvested yet the minor elements are taken into the root system in perhaps somewhat greater concentration than they are present in the harvestable portion of the crop. For this reason the effect of a single application carries over beyond the year in which the application is made due to the presence of the soil of the roots of previous crops.

For general field crop use the spacing of 3' x 3' is probably best for most soils. For row crops, however, while the 3' x 3' spacing is effective, many farmers prefer to place the fertilizer or minor elements in rows between and parallel to the crop rows. Assuming that the crop rows are three feet apart the packages of minor elements should be distributed in a line intermediate each pair of crop rows and should be spaced approximately eighteen inches. For this purpose, however, each individual package should contain one-half as much of the minor element mixture as recommended for 3' x 3' spacing.

It is essential that each package hold itself as a unit while permitting slow access of the soil moisture to the soluble elements of the mix which naturally diffuse or migrate to a radius of approximately three feet in all directions from the package.

Distribution, of course, can be accomplished by hand or, for large scale operations, a magazine and a package feeder may be attached to alternate plows of a gang. Such package feeders can be arranged to drop packages at predetermined intervals directly to the rear of the point of the plow-share.

The individual packages may take a number of different forms, each however fulfilling the requirements of the process. For example, the package may comprise a two-ply flat bag about 3" x 4", the outer ply being formed of wet strength kraft paper perforated at one-inch intervals by holes approximately ⅛" in diameter. In such case the inner ply should be an imperforate sheet of bleached or unbleached sulphite paper. This inner ply serves to prevent any sifting of contents during shipping and handling but is dissolved by the soil acids in a relatively short time. The perforations in the outer ply permit access of the acids to the inner ply and of moisture in the soil to the contents when the inner ply is dissolved. At the same time, the more highly resistant outer sheet prevents rapid dissemination of the minor elements and slows down permeation of the soil for a period of from 30 to 60 days, depending on the nature of the soil, the amount of rainfall, etc.

Because soluble elements migrate more rapidly in the vertical than in the lateral direction in soil, it is extremely desirable that the packages be flat and that their major surface be approximately parallel to the surface of the ground to avoid the possibility of local areas of toxicity directly above the package.

If desired, the two plies just mentioned could be adhered together to form a single laminated sheet of which the packages may be made. A further variation is to subject a single sheet of wet strength kraft to an electro-perforating operation of the type disclosed in U. S. Patent No. 2,372,308 in which the electro-perforating is controlled so that the perforations are too small in individual diameter to permit sifting but sufficiently great in total area to permit free access of the soil moisture to the enclosed minor elements.

Still another variation lies in the use of a perforated cardboard box either laminated to or lined with a tightly closed imperforate sulphite sheet.

The packages may be given any of the conventional forms, such as flat or square bags or envelopes or satchel bottom or automatic bags. Any of the packages may be formed, filled and closed by entirely conventional means involving either ordinary paste in the seams and closures or staples or heat seals. In the heat sealing category, a satisfactory package may be made out of a laminated heat sealable glassine electro-perforated, as above noted. In fact, by resort to electro-perforation, such materials as cellophane, Pliofilm and polyethylene may be used. Cloth bags could be used but in such case it would be necessary to apply to the cloth a soluble coating of starch or gelatin which would serve to prevent sifting but which in contact with the soil acids would dissolve to permit access of the moisture to the enclosed elements.

None of the above variations have been illustrated since the specific package construction is completely immaterial provided the above outlined requirements are effectively met.

We claim:

A package comprising: the charge of a mixture of soil replenishing elements, said elements comprising soluble compounds of one or more of copper, boron, zinc, manganese and iron, and a container for said charge, said container comprising an inner imperforate moisture-pervious ply and an outer perforated moisture-resistant ply, said package being formed with a broad major surface and being relatively thin in the direction normal to said surface.

L. WAYNE ARNY.
HENRY W. STEVENS.

References Cited in the file of this patent

UNITED STATES PATENTS

| Number | Name | Date |
| --- | --- | --- |
| 1,038,316 | Dokkenwadel | Sept. 10, 1912 |
| 1,971,390 | Van Yahres | Aug. 28, 1934 |
| 1,988,307 | Fay | Jan. 15, 1935 |
| 2,091,993 | Jones | Sept. 7, 1937 |
| 2,117,808 | Jones | May 17, 1938 |
| 2,280,451 | Riddle | Apr. 21, 1942 |
| 2,341,800 | Martin | Feb. 15, 1944 |